United States Patent [19]

Brown

[11] 4,168,371

[45] Sep. 18, 1979

[54] PROCESS FOR MAKING LIGNIN GELS IN BEAD FORM

[75] Inventor: Wynford Brown, Upsala, Sweden

[73] Assignee: Westvaco Corporation, New York, N.Y.

[21] Appl. No.: 947,450

[22] Filed: Oct. 2, 1978

Related U.S. Application Data

[62] Division of Ser. No. 765,683, Feb. 4, 1977, Pat. No. 4,131,573.

[51] Int. Cl.$^2$ .......................... B01D 15/08; C08F 6/04
[52] U.S. Cl. .................................. 528/482; 210/31 C; 252/426
[58] Field of Search ....................... 528/482; 210/31 C

[56] References Cited

U.S. PATENT DOCUMENTS

| | | | |
|---|---|---|---|
| Re. 26,934 | 8/1970 | Mosbach | 260/29.6 |
| 2,874,545 | 2/1959 | Twining | 61/36 |
| 3,149,058 | 9/1964 | Ball et al. | 260/17.5 |
| 3,657,117 | 4/1972 | Pfitzner et al. | 210/31 |
| 3,759,826 | 9/1973 | Felicetta et al. | 210/31 C |
| 4,001,202 | 1/1977 | Dilling et al. | 260/124 R |
| 4,055,510 | 10/1977 | Peska et al. | 252/426 |

*Primary Examiner*—Earl A. Nielsen
*Attorney, Agent, or Firm*—Ernest B. Lipscomb, III; Terry B. McDaniel

[57] ABSTRACT

Disclosed herein is a process for making high molecular weight lignin gel beads by emulsifying an aqueous lignin-containing solution in a water-immiscible organic solvent and reacting the lignin in said emulsion with a cross-linking agent, said reaction being catalyzed by alkali to form lignin gel beads and recovering the beads from the reaction. The lignin gel beads are useful for the fractionation and recovery of compounds by gel permeation.

12 Claims, No Drawings

PROCESS FOR MAKING LIGNIN GELS IN BEAD FORM

This is a division of application Ser. No. 765,683, filed Feb. 4, 1977, now U.S. Pat. No. 4,131,573 issued Dec. 26, 1978.

BACKGROUND OF THE INVENTION (1) Field of the Invention

This invention relates to a process for making high molecular weight, cross-linked lignin gel beads. More particularly, this invention relates to an improved process for making lignin gels in bead form by reacting an emulsion containing an aqueous solution containing a water-insoluble lignin with a cross-linking agent in the presence of alkali. The invention also relates to a process for the separation of compounds by contacting a solution of the compounds with the lignin gel beads.

(2) The Prior Art

Colloid gels from waste sulfite liquor are described in U.S. Pat. No. 1,839,061 to R. G. Tellier. These gels are used as a medium for treating an argillaceous material to form a colloid gel which contains organic matter and a mordant. In U.S. Pat. No. 2,874,545, R. H. Twining describes a process for forming a water-insoluble gel by reacting lignosulfonates with solutions of boric acid and a soluble chromate. In U.S. Pat. No. 3,759,826, V. F. Felicetta and E. G. King describe processes for making lignin gels by polymerization under acid conditions or cross-linking with formaldehyde. These gels are useful for the fractionation and recovery of water-soluble compounds by gel permeation.

In the past lignin has been reacted with epichlorohydrin. For example, in U.S. Pat. No. 3,672,817 to S. I. Falkehag, a water-soluble sulfonated lignin was reacted with epichlorohydrin to block phenolic hydroxyl groups of the lignin to reduce fiber staining and diazo dye reduction of these lignin dispersants. In U.S. Pat. No. 4,001,205, P. Dilling and G. Prazak disclose a process for producing a water-soluble dispersant by reacting a sulfonated lignin with epichlorohydrin to both block a portion of the free-phenolic hydroxyl of the lignin and to cross-link lignin molecules. On the other hand, the lignin gel beads made according to the process of this invention are not water-soluble.

It is, therefore, the general object of this invention to provide a process for producing lignin gels in bead form.

Another object of this invention is to provide a reversibly swellable lignin gel in a form not requiring any disintegration of the reaction product form for use in gel permeation.

Yet another object of this invention is to provide a process for the fractionation and recovery of compounds by gel permeation or selective sorption depending on molecular dimensions or polar character using lignin gel beads.

Other objects, features and advantages of this invention will be evident from the following detailed description of the invention.

SUMMARY OF THE INVENTION

It has been found that the objects are accomplished by providing an aqueous solution containing a lignin, agitating the aqueous lignin solution with a water-immiscible organic solvent to form an emulsion comprising aqueous droplets containing the lignin within the continuous phase of the organic solvent, reacting the lignin in the emulsion with a cross-linking agent, the reaction being catalyzed by the presence of alkali, until gel bead formation has taken place and recovering the gel beads.

DETAILED DESCRIPTION OF THE INVENTION

Water-insoluble lignins are employed, particularly the alkali lignins, to make the gels of this invention. Alkali lignins are derived by the alkaline digestion of lignocellulosic material. Most commonly, they are obtained as byproducts from the alkaline process of paper making where sodium hydroxide alone or in combination with sodium sulfide is employed. These lignins are generally referred to as soda and kraft lignins, or sulfate lignins after the pulping process used. Such alkali lignin starting material is employed in the salt form, i.e., where the sodium or potassium cation has replaced the hydrogen, so it will be water-soluble. Additionally, other water-solubilizing, salt-forming cations may be used, such as ammonia. In the preferred practice of this invention, the alkali lignin employed is a kraft pine lignin although desulfonated waste sulfite liquor lignin may be used. The lignin gels may also be additionally modified as long as the modification still renders them water-insoluble and does not restrict the cross-linking reaction. Additionally, modified lignin gels of this type include, for example, hydroxy (aliphatic hydrocarbon) lignin, such as hydroxyl propyl lignin, and dicarboxy (aliphatic hydrocarbon) lignin, such as dicarboxy methyl lignin and sulfonated lignin gels, modified as shown in Examples 2-4.

To form the aqueous lignin-containing solution into an emulsion, the aqueous solution is agitated with a water-immiscible organic solvent which serves as the continuous phase. The mole ratio of said lignin to said organic solvent is preferably from 1:10 to 1:1. Suitable organic solvents are aliphatic and aromatic hydrocarbons, halogenated aliphatic and aromatic hydrocarbons, such as ethylene, benzene, dichloromethane, 1,2-dichloroethane, 1,2-dibromoethane, o-dichlorobenzene and 1,2-dichloroethylene.

The cross-linking agents are bifunctional organic compounds, such as epichlorohydrin, dichlorohydrin, 1,2,3,4-diepoxybutane, bis-epoxypropyl ether, ethylene glycol-bis-epoxypropyl ether and 1,4-butane-diol-bis-epoxy-propyl ether. The aliphatic chains of these bifunctional organic compounds form the cross-linking bridges between the phenolic hydroxyl groups of the lignin molecules. The amount of lignin to cross-linking agent should be at a mole ratio of at least 1:10.

Any alkali can be used to catalyze the cross-linking reaction. The alkali-metal hydroxides, such as sodium hydroxide, are, however, the most frequently used and are preferably used in an amount of 20% to 50% by weight of lignin. Such substances as quaternary ammonium compounds, the alkali metal and alkaline earth metal carbonates and alkaline earth metal hydroxides may also be used.

It is advisable to add a stabilizing agent to the organic solvent forming the continuous phase. Stabilizing agents include, for example, high molecular weight, water-insoluble polymers, such as polyvinylacetate, polystyrene, polyisobutylene and cellulose-acetate-butyrate. The molecular weight of the polymers determines, to a considerable degree, their action as stabilizing agents, with polymers having relatively high average molecular weights being capable of stabilizing the dispersion more effectively than products having lower average molecular weights. Suitable amounts of the stabilizing agents are in the range of from 0.1 to 15 grams, preferably in the range of from 0.1 to 10 grams per 100 milliliters of organic solvent.

The process according to the invention for making lignin gel beads comprises reacting, in the presence of alkali, a water-insoluble lignin with a bifunctional cross-linking agent by mixing an aqueous solution of water-insoluble lignin with an organic solvent capable of forming a two-phase system therewith, under sufficient agitation to convert the aqueous lignin-containing solution into drops suspended within the medium, and by reacting the cross-linking agent with the lignin in the presence of alkali, at least until gel formation has taken place, whereupon the gel beads of the lignin formed from the drops are recovered.

The alkali required to catalyze the reaction is usually contained in the aqueous lignin-containing solution, but it is also possible to supply the alkali dissolved in the liquid forming the continuous phase of the two-phase system. There is, however, nothing to prevent forming the two-phase system first, after which the alkali is added by dissolving into the two-phase system mixture to catalyze the cross-linking reaction.

In order to effect the reaction, it is advisable to proceed in such a way that a solution of the alkali and lignin is mixed with the organic solvent which is to serve as the continuous phase of the two-phase system, under sufficient agitation conditions to attain the desired sizes of the suspended drops, whereupon the cross-linking agent is supplied into the two-phase system, if desired, in a stepwise manner. The cross-linking agent may, however, also be added to the two-phase system dissolved in the organic solvent serving as the continuous phase. This sequence of the different operating steps is desirable in practice, but it is also possible to contact a portion of the cross-linking agent or the whole amount thereof with the aqueous lignin-containing solution before the two-phase system has been formed. In this connection, gel formation has to be prevented from taking place before the two-phase system has been formed. This can be attained by maintaining the mixture at a sufficiently low temperature to cause the reaction to proceed so slowly that the mixing operation can be carried out. The gel formation reaction can also be prevented by not adding the alkali until drop formation has taken place.

The concentration of the lignin is of great importance because it determines the reswellability (water regain) of the final gel. Using a low concentration of the lignin will result in a higher reswellability of the final product than when a higher concentration thereof is used. The concentration of the lignin can be 5% to 70% by weight, preferably concentrations in the range of from 10% to 50% by weight.

The reaction temperature will determine the speed at which the bead formation takes place. Suitable temperatures are between room temperature and 100° C., preferably in the range of from 20° C. to 60° C.

The stabilizing agent can be removed from the gel beads by treating the beads with a suitable solvent. It is advisable when using high molecular weight polymers capable of undergoing hydrolysis under relatively mild conditions to first treat the gel beads with, for example, a solution of alkali metal hydroxide, and then remove the hydrolyzed products by washing the gel beads with a solvent for these products.

It is frequently desirable to add the cross-linking agent to the emulsion only when suitable drop sizes have been attained. The time at which gel formation takes place depends on the concentration of lignin in the dispersed phase, the amount of cross-linking agent, the temperature, and the like. After the gel formation has taken place, the agitation will be of no, or less, importance for the particle sizes of the final gel beads.

The property which determines the quality of the gel beads as a molecule sieve is its water regain or solvent regain. This is determined by swelling the product in water or organic solvent and removing the remaining free liquid, for example, by centrifuging. The water or solvent regain is stated in number of grams of the combined water or solvent per gram of the dry gel. The lignin gels have been tested for molecule sieving purposes in connection with which excellent results have been obtained due to the fact that the beads are ball-shaped and accordingly present a lower flow resistance when packed together, than columns comprising gels of copolymers obtained by grinding or other disintegration operations.

The practice of this invention is clearly illustrated by the following examples.

EXAMPLE 1

This example illustrates a procedure for making the lignin gel beads according to this invention. Fifty (50) grams of kraft lignin were dissolved in sufficient 2 M NaOH to give a clear solution of approximately 250 milliliters. The solution was emulsified by agitating in 3 liters of 1,2-dichloroethylene, which contained 25 grams of emulsifier (Cremaphor EL by B.A.S.F.) to stabilize the emulsion. Five Hundred (500) grams of epichlorohydrin were added to the emulsion and stirring continued at 40° C. for 12 hours at which time a mass of gel beads had formed. The gelled mass of beads was well washed with water thereby breaking the emulsion; the gel beads were then neutralized to pH, washed again with water and finally acetone. The beads were vacuum dried at 40° C. The beads were rather uniform and spherical with a diameter about 50$\mu$. Reswelling was low in water and dioxane, about 1.9 ml./gm. and higher in polar solvents; DMF 5 ml./gm., DMSO 8 ml./gm. and alkali 8 ml./gm.

EXAMPLES 2–4

In gel chromatography with low molecular weight non-ionic solutes, the partition coefficient, K, and its molecular weight dependence are extremely sensitive to polar interactions between the functional groups of solute and gel matrix relative to the solvent. This sensitivity forms the basis for selective separations of small molecules on "inert" (i.e., non site-specific) gels. On the other hand, with high molecular weight, polymeric, solutes such "inert" gels achieve separations by a different mechanism. Polar interactions now play an insignificant role in determining both the magnitude of K and its molecular weight dependence. This fact permits polymer separation on the basis of molecular size by a steric mechanism and has led to the development of gel filtration or gel permeation chromatography. Thus, three modifications of lignin gels from Example 1 were made to illustrate the sensitivity of polar interactions.

(a) Dicarboxymethylation

A lignin gel from Example 1 (20 grams) was exhaustively washed with acetone and vacuum dried at 40° C. After swelling in isopropanol (500 milliliters) overnight, sodium hydroxide (43 milliliters of 60% aqueous solution) was added dropwise during one hour. The mixture was allowed to stir for another hour. Diethylchloromalonate (15 grams) was added slowly to the mixture and the temperature then raised to 60° C. The chemical modification was complete after 2 hours. The modified gel was well washed with water and neutralized with acetic acid (10% aq.) Following exhaustive washing with water, the material was washed with dry acetone and vacuum dried at 40° C.

(b) Hydroxypropylation

The above procedure was followed, but using 1,2-epoxypropane instead of diethylchloromalonate.

(c) Sulfonation

A lignin gel from Example 1 (20 grams) was allowed to swell in sufficient NaOH(0.1 M) to thoroughly wet the material. $Na_2SO_3$ (350 milliliters of 2 M) was added at room temperature. The mixture was autoclaved for 6 hours at 120° C. The modified gel was thoroughly washed with water, neutralized with 10% acetic acid, washed again with water followed by acetone, and finally vacuum dried at 40° C.

Data presented in the table below illustrates how, on the one hand, chemical modification of the lignin constituting the gel matrix radically alters the partitioning. Similarly, further data show the sensitivity of the partition coefficient to the character of the solute. Partition coefficients, K, for various homologous series on lignin and lignin derivative gels. (DCML=dicarboxymethyl lignin; HPL=hydroxypropyl lignin).

$$K = \left(\frac{V_e - V_o}{V_T - V_o}\right)$$

where
$V_e$ = elution volume,
$V_o$ = void volume,
$V_T$ = total gel volume.

| Polyhydric Alcohols | Lignin (DMF) | DCML (DMF) | DCML ($H_2O$) | HPL (DMF) | HPL ($H_2O$) | Lignin Sulfonate ($H_2O$) |
|---|---|---|---|---|---|---|
| E. glycol. | 0.721 | 0.609 | 0.486 | 0.652 | 0.563 | 1.00 |
| Glycerol | 0.693 | 0.588 | 0.422 | 0.634 | 0.488 | 0.983 |
| Erythitol | 0.700 | 0.556 | 0.343 | 0.652 | 0.429 | 0.979 |
| Arabitol | 0.740 | 0.524 | 0.281 | 0.678 | 0.408 | 0.958 |
| Mannitol | 0.783 | 0.483 | 0.229 | 0.726 | 0.368 | 0.952 |
| $V_o =$ | 19.76 | 20.77 | 19.83 | 17.40 | 17.77 | 19.15 |
| $V_T =$ | 33.47 | 33.05 | 32.69 | 32.53 | 34.60 | 35.70 |

| Polyethylene Oxides | Lignin (DMF) | HPL ($H_2O$) | Cellodextrins | Lignin (DMF) | HPL ($H_2O$) |
|---|---|---|---|---|---|
| PEG 200 | 0.649 | 0.636 | G1 | 0.662 | 0.362 |
| 300 | 0.585 | 0.707 | G2 | 0.508 | 0.254 |
| 400 | 0.530 | 0.687 | G3 | 0.357 | 0.239 |
| 600 | 0.430 | 0.667 | G4 | 0.320 | 0.201 |
| 1000 | 0.290 | 0.620 | G5 | 0.265 | 0.160 |
| $V_o =$ | 17.28 | 17.77 | | 17.28 | 17.77 |
| $V_T =$ | 31.80 | 34.60 | | 31.80 | 34.60 |

The results showed how the polyhydric alcohols partition in lignin-based gels as a function of molecular size in (a) water and (b) dimethyl formamide (DMF). The derivative gels swell readily in water (swelling 6–8 ml./gram). The magnitude of K is determined by the competitive interaction between solute and solvent and the polymeric constituent. Thus, the alcohols interacted most strongly with the polar, sulfonated gel and least with the dicarboxymethylated material and vice versa for the solvent.

In DMF the partition coefficients were, in general, higher. This may be expressed as being due to the lower solubilities of the alcohols in DMF compared to water and/or the stronger interactions of the gels with water. The remainder of the table shows how various solute types partition in (a) the hydroxypropylated lignin gel swollen in water and (b) the lignin gel swollen in DMF.

In both solvents, the polyethylene glycols have a higher affinity for the gel phase than the relatively more polar cellodextrins. The hydroxypropyl gel in water provides a more sensitive separation system since polar interactions are accentuated with water as medium.

EXAMPLE 5

A commercially available kraft lignin (Indulin AT, manufactured by Westvaco Co., Charleston, USA) was used. Two-Hundred (200) grams of lignin were dissolved in 600 grams 2 M sodium hydroxide. The solution was stirred for 4 hours in order to ensure complete dissolution. This solution was then thoroughly filtered on glass frits and finally on a glass-fiber filter (Whatman GF/A) in order to remove small amounts of residual cellulosic fibers and colloidal material. The lignin solution was added to a three-necked 5-liter reaction vessel equipped with a high intensity stirrer. Three (3) liters of 1,2-chloroethane (bp 88°–90° C.) were then added and the two-phase system was stirred for 15 minutes. During the stirring, some (<10%) of the low molecular weight lignin was dissolved in the dichloroethane phase. After this period of stirring, 15 grams of emulsifier (Cremophor EL, BASF) were added and the mixture was then stirred for another 2 hours.

At this point, the cross-linking agent (60 grams epichlorohydrin) was added to the reaction vessel. The cross-linking reaction was run in two steps, first for 48 hours at the same temperature as before (21° C.) and then for 24 hours at an elevated temperature (40° C.), with continuous stirring.

After cooling to room temperature, the reaction product was picked up on a screen with 0.18 mm in open diameter and washed thoroughly, first with 2 M sodium hydroxide and then with tap water. Finally, a small quantity of coarse beads was removed on a 0.35 mm screen. The gel beads were stored in tap water under slightly alkaline conditions in a refrigerator. The total yield in the preparation of the gel beads was approximately 85 grams. The gel beads in DMF were spherical and of fairly uniform size. The mean diameter was found to be 220 μm.

EXAMPLE 6

This example illustrates the effectiveness of lignin gels in gel permeation chromatography.

The gel beads from Example 5 were deaerated and packed in a glass column (height 65 cm., diameter 1 cm.) equipped with two Teflon seals. Prior to column packing, the lignin gel beads were washed with 0.5 M sulfuric acid to convert the acidic groups to the hydrogen form. The gels were then washed with distilled water to neutral pH and finally with DMF. The column was connected between a peristaltic pump and a differential refractometer (Waters Associates, Milford, Mass.) and a drop counter (LKB-Produkter AB, Bromma, Sweden) in series. A total of 3.0 m silicone-tubings (diameter 1 mm) was used. The drop counter was adjusted to give a chart mark (=1 count) for every 16 drops, which is equal to 0.484 milliliter. The column was thermostated to 25° C. and protected from UV-radiation with aluminum foil.

Narrow molecular weight distribution polystyrene standards (Pressure Chemical Co., Pittsburgh) of weight average molecular weights (M) 2,900; 3,600; 15,000; 19,500; 35,000; 110,000; 200,000; and 470,000 were used. The void volume was found to be 100 counts as determined from DMF labeled with C-14 (The Radiochemical Centre, Amersham, Buckinghamshire, England) and excluded volume 28.5 counts as determined with polystyrene 470,000.

A change in sample concentration from 1 to 10 grams/liter (sample load 1 count) did not affect the elution volume. At the highest concentration, no change in elution volume was detected at flow rates between 1.06 and 11.07 ml/h, cm$^2$. Normally the flow rate was 3.75 ml/h, cm$^2$ and the sample concentration 5.0 grams/liter. The lignin gel was thus found to separate polystyrenes of various molecular weights.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for separating from one another two or more substances having different molecular sizes or polar character in which a solution of said substances is brought into contact with a plurality of high molecular weight cross-linked lignin gel beads capable of selectively sorbing substances from the solution, in dependence upon their molecular dimensions or polar character, and fractions of the separated substances are successively recovered by elution with liquid, characterized in that the separation is carried out with lignin gel beads made according to the steps comprising:
   (a) providing an aqueous solution containing a lignin from the group consisting of alkali lignin and desulfonated sulfite waste liquor lignin;
   (b) agitating the aqueous lignin solution with a water-immiscible organic solvent to form an emulsion comprising aqueous droplets containing the lignin within the continuous phase of the organic solvent;
   (c) reacting with the lignin a cross-linking agent capable of reacting with the hydroxyl groups of the lignin with the formation of ether bridges, the cross-linking agent being selected from the group consisting of epichlorohydrin, dichlorohydrin, 1,2,3,4-diepoxy-butane, bis-epoxy propyl ether, ethylene glycol-bis-epoxy propyl ether and 1,4-buta-diol-bis-epoxy propyl ether;
   (d) the reaction being catalyzed in the presence of alkali;
   (e) the droplets being maintained until gel formation has taken place as the result of the reaction of the lignin with the cross-linking agent in the presence of the alkali; and
   (f) recovering the gel beads of the cross-linked lignin from the reaction.

2. The process according to claim 1 wherein the lignin is an alkali lignin.

3. The process according to claim 2 wherein the concentration of the alkali lignin in said aqueous solution is from 5% to 70%.

4. The process according to claim 1 wherein the water-immiscible organic solvent is a member of the group consisting of aliphatic hydrocarbons, aromatic hydrocarbons, halogenated aliphatic hydrocarbons and halogenated aromatic hydrocarbons.

5. The process according to claim 4 wherein the water-immiscible organic solvent is a member of the group consisting of dichloromethane, 1,2-dichloroethane, 1,2-dibromomethane, o-dichlorobenzene and 1,2-dichloroethylene.

6. The process according to claim 1 wherein the cross-linking agent is epichlorohydrin.

7. The process according to claim 6 wherein the mole ratio of the lignin to the cross-linking agent is at least 1:10.

8. The process according to claim 1 wherein the alkali is sodium hydroxide.

9. The process according to claim 8 wherein the sodium hydroxide is added in an amount from 20% to 50% by weight of lignin.

10. The process according to claim 1 wherein the emulsion is stabilized with a water-insoluble high molecular weight polymer from the group consisting of polyvinyl acetate, polystyrene, polyisobutylene and cellulose-acetate-butyrate.

11. The process according to claim 10 wherein the water-insoluble polymer is added in an amount from 0.1 to 15 grams per 100 grams of organic solvent.

12. The process according to claim 1 wherein the reaction is carried out at a temperature between 20° C. and 60° C.

* * * * *